United States Patent Office 3,108,668
Patented Oct. 29, 1963

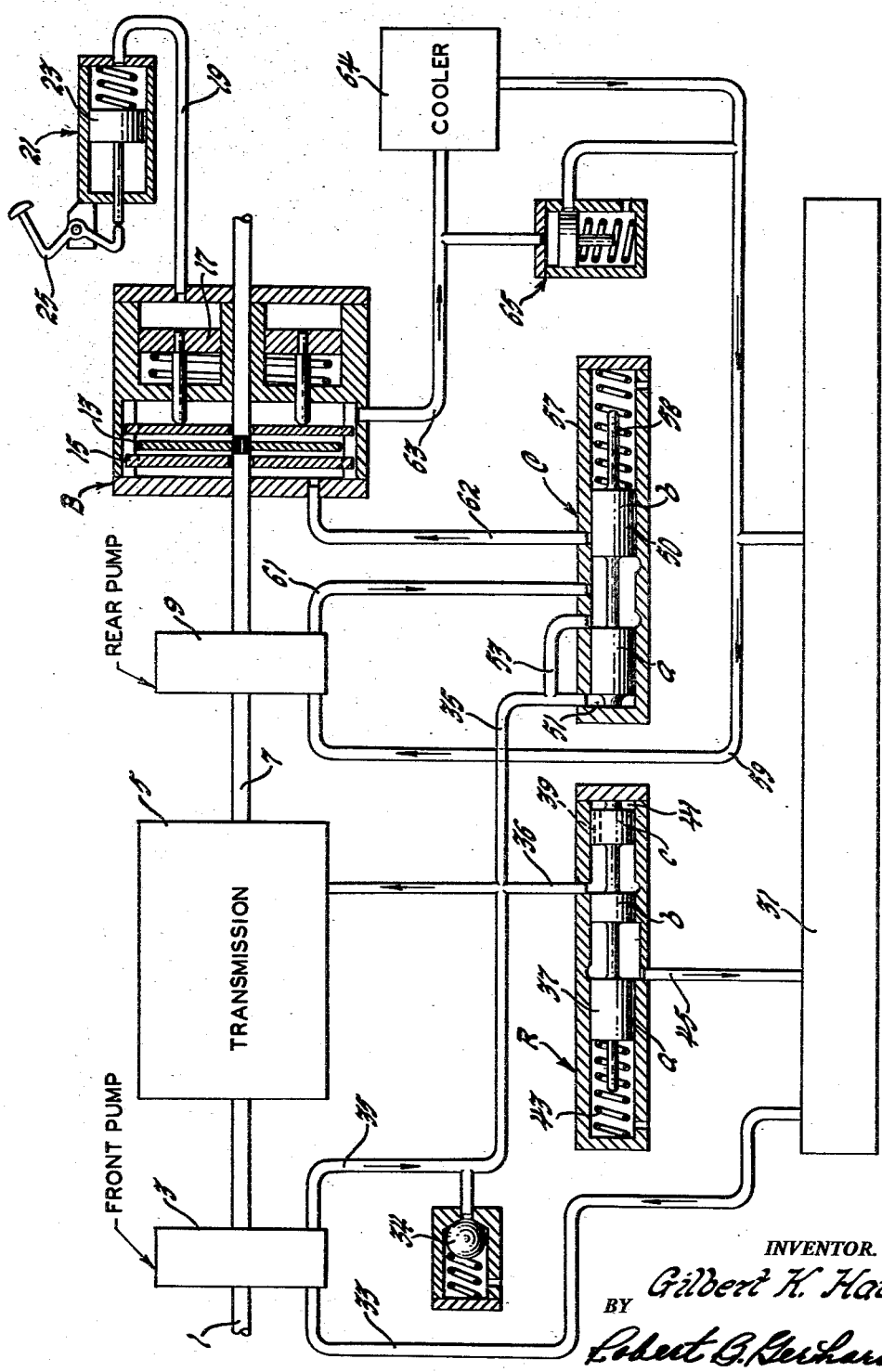

3,108,668
VEHICLE PRESSURE SUPPLY SYSTEM
Gilbert K. Hause, Bloomfield Hills, Mich., assignor to General Motors Corporation, Detroit, Mich., a corporation of Delaware
Filed July 24, 1961, Ser. No. 126,218
8 Claims. (Cl. 192—4)

This invention relates to fluid pressure supply systems and more particularly to a fluid pressure supply system for motor vehicle transmissions and brake systems.

Motor vehicle automatic transmissions that utilize fluid pressure operated servos for establishing different drive ratios in the transmission, normally employ one or more fluid pressure pumps to supply the needed fluid pressure. In order to provide this pressure when the vehicle is stationary, at least one pump must be driven whenever the vehicle engine is operating. In order to provide fluid pressure to the transmission control system including servo operated brakes and clutches and any hydrodynamic torque transmitting mechanism incorporated in the transmission when the engine is not operable, some transmissions have a secondary pump driven in unison with the vehicle. Thus any time that the vehicle is moving as when it is being pushed or towed by another vehicle, the vehicle driven pump will act to provide fluid under pressure to the transmission control system and fluid operated servos to establish a drive between the vehicle wheels and the vehicle engine. This operation is generally known as a push start.

The provision of a separate vehicle driven pump solely for push start operation requires the use of an expensive component that is seldom used and yet may require considerable horsepower for operation of the same during normal drive conditions.

There have been proposed for vehicle brake systems arrangements that utilize friction brake means on the final drive train of the vehicle. In order to provide an efficient brake mechanism of this kind, it is desirable to utilize a fluid cooled brake in order to provide large braking capacity and relatively long life for the friction members in the brake. This fluid cooling requires a fluid pressure pump that is operable whenever the vehicle is moving and it should be capable of providing a relatively large volume of fluid to the brake mechanism for cooling thereof.

It would be advantageous if the transmission fluid supply and brake cooling functions were to be performed by a single pump which could efficiently perform each of these functions without decrease in efficiency of either one of the functions.

It is therefore an object of this invention to provide a fluid pressure control system that supplies fluid under pressure for both a fluid pressure operated power transmission and a fluid cooled vehicle brake system.

It is a further object of the invention to provide a fluid pressure supply system for a vehicle which utilizes a pair of pumps one of which automatically functions to provide fluid under pressure to a fluid operated transmission or to a fluid cooled brake system.

These and other objects and advantages will be readily apparent from the following description and accompanying drawing which schematically illustrates the application of the invention to a representative motor vehicle transmission and brake system.

Refering to the FIGURE, there is shown an input shaft 1 which would be connected to the vehicle engine, not shown. The shaft 1 drives a fluid pressure pump 3 of any positive displacement type and also acts as a power input shaft to a speed change transmission 5. The pump 3 is hereinafter referred to as the front pump. The transmission 5 is of any suitable type that employs fluid actuated controls and a servo mechanism for establishing various speed ratios in the transmission. The transmission 5 may also include a hydrodynamic device such as a fluid coupling or hydraulic torque converter.

The transmission 5 has a driven or output shaft 7 that drives a second fluid pressure pump 9 hereinafter referred to as the rear pump. The transmission output shaft 7 is connected through any suitable means to final drive mechanism, such as a rear axle differential, to the drive wheels of the transmission.

A brake unit, generally designated B, for braking the output shaft 7 and hence the vehicle itself is schematically shown in the figure. This brake unit is shown as a multiple disc type wherein one or more friction discs 13 are splined or otherwise connected to the output shaft 7 and wherein a plurality of friction discs 15 are spaced between the driven discs 13. A fluid pressure operated piston 17 is provided to engage the friction discs 13 and 15 to brake the vehicle. The piston 17 can be actuated by hydraulic pressure in a conduit 19 connected to a master cylinder generally designated 21 and which includes a piston 23 operable by a foot pedal 25. This control and operation of the brake which forms no part of the invention may be of any type, the foot operated static pressure system shown being merely for illustration.

A fluid sump 31 containing a volume of hydraulic fluid forms a source of fluid for both the transmission system and the cooling of the brake unit B. The front or engine driven pump 3 is connected by a suction passage 33 to the sump 31 and has a pressure discharge into conduit 35. A relief valve 34 acts to limit the maximum pressure in the conduit 35 which is connected to transmission 5. The conduit 35 is also connected through a branch passage 36 to a pressure regulator valve assembly generally designated R, which may be of any suitable type but which is shown as a simple spool valve 37 having lands a, b, and c.

The pressure regulator valve R, which regulates the pressure in the conduit 35, operates in a conventional manner. The pressure in the branch passage 36 enters the valve assembly through a port between the lands b and c, passes through a passage 39 formed in the valve member 37 and acts in a chamber 41 to urge the valve member 37 to the left, as viewed in the figure. This movement of the valve member 37 is opposed by a spring 43. Sufficient movement of the valve member 37 to the left by fluid pressure eventually allows oil to bypass the land b and exhaust through a conduit 45 to the sump 31. This acts to relieve the pressure in the conduit 35 and hence chamber 41 so that the spring 43 tends to move the valve member 37 to the right. The valve member 37 will operate to relieve excess pressure over that required to balance the force of the spring 43 acting on member 37. This is the spring force that exists when the spring is compressed enough to permit oil to pass around land b into the space between lands a and b and hence into the relief passage 45.

A second pressure regulator valve, generally designated C, includes a spool valve member 50 having lands a and b. Valve C includes a chamber 51 connected to a passage 53 which transmits pressure in passage 53 to the end of the valve member 50 to urge the same against a spring 57. The valve member 50 is normally held by the spring 57 in the position shown in the figure. Pressure from the front pump 3 will act through passage 53 and in the chamber 51 to move the valve member 50 against the spring 57. Normal regulated pressure from pump 3 is sufficient to move the valve 50 until a stop 58 thereon engages the end of the bore in the valve body.

The rear pump 9 is connected by a suction passage 59 to the sump 31 and discharges its pressure to a conduit 61 leading to the valve C. A brake cooling inlet conduit 62 leads from the valve C to the brake unit B. A fluid outlet conduit 63 leads from the brake unit B into a cooler 64 from which the fluid returns to the sump 31. A cooler bypass valve, generally designated 65, provides for the fluid bypassing the cooler 64 in the event that the cooler becomes clogged etc. The valve 65 may also be thermostatically operated to bypass the cooling fluid around the cooler 64 whenever it is below a predetermined temperature.

When the vehicle engine is operating and the front pump 3 is providing fluid under pressure to the transmission 5, this same pressure acts in the chamber 51 of the valve C to move the valve member 50 to the right. This acts to connect the rear pump discharge passage 61 to the brake cooling inlet passage 62. Whenever the vehicle is moving the rear pump 9 will supply cooling oil to the brake unit B, the volume of fluid supplied varying with vehicle speed.

In the event that the engine cannot be started normally, the front pump will be inactive and the brake cooling valve C will be in the position shown in the figure. If the vehicle is then moved as by pushing, the rear pump 9 will be driven by the shaft 7 and will supply oil into the conduit 61 and through the passage 53 into the conduit 35. Since the front pump 3 is stationary and is of a positive displacement type there is little or no leakage of oil backward through the pump 3. At the same time the supply of fluid to the brake cooling inlet conduit 62 is cut off by land b of the valve 50. As the pressure from pump 9 acting in the conduit 35 builds up, this pressure acts in chamber 51 of the valve 50 to move the same against the spring 57. The spring 57 and the area of the valve 50 exposed to oil in the chamber 51 are calibrated so that when the pressure in conduit 35 reaches a predetermined value, which is less than the pressure in the system normally maintained in the pressure regulator valve R, the valve member 50 will be moved to the right to exhaust oil into the passage 62 leading to the brake B. At the same time land a will cut off branch 53. If the pressure regulator valve R normally regulates the pressure in conduit 35 at, say 70 p.s.i., then the valve C would be calibrated to maintain a slightly lower pressure, such as 65 p.s.i. This action of the valve C will provide pressure regulation at this predetermined value of 65 p.s.i. and at the same time will provide a continuing supply of fluid to the brake B for cooling thereof. Therefore under these conditions i.e. the vehicle being pushed, there is available in conduit 35 a fluid pressure which, though less than the 70 p.s.i. normally maintained by the valve R during normal operation of the vehicle, is sufficient to enable the transmission control system and fluid servos therein to establish drive in the transmission. With the transmission in a drive condition and the vehicle moving so that both shafts 7 and 3 are rotating, the front pump 3 will be driven as well as the engine. Pressure from pump 3 acting through passage 35 in chamber 51 will move the valve member 50 against the spring to its normal brake cooling position wherein all of the output from pump 9 will flow into the brake cooling inlet passage 62 for cooling of the brake B.

With the engine driven by the vehicle it usually can be started, whereupon it will take over drive of the front pump 3. Thus it will be seen that the rear pump 9 normally provides fluid for cooling the brake B but will automatically supply fluid at a regulated pressure to the transmission system whenever the front pump 3 fails to provide fluid under pressure less than 65 p.s.i. to the transmission. This change between the functions of the pump 9 is entirely automatic. By using the invention two pumps can perform the same functions as three pumps with the resulting cost, weight, size and power consumption savings being apparent.

Changes, modifications, and other applications will be readily apparent to those skilled in the art and such changes and applications are within the scope of the invention which is limited by the following claims.

We claim:

1. A fluid pressure supply system for a vehicle having a fluid pressure controlled transmission having an engine driven input member and a vehicle driving output member, the vehicle also including at least one liquid cooled vehicle brake having brake elements, the system including a first fluid pressure pump operated with the engine driven input of the transmission and a second fluid pressure pump operable with the vehicle driving output of the transmission, said first pressure pump arranged to normally supply fluid under pressure to the transmission for establishment of drive therein and control thereof during operation of the vehicle engine, valve means responsive to a predetermined pressure from said first pump for connecting the output of said second pump solely to the brake elements of said liquid cooled vehicle brake, said valve means responsive to the pressure from said first pump being less than a predetermined minimum to connect the output of said second pump to the transmission for establishment of drive therein.

2. A fluid pressure supply system for a vehicle having a fluid pressure controlled transmission having an engine driven input member and a vehicle driving output member, the vehicle also including at least one liquid cooled vehicle brake, the system including a first fluid pressure pump operated with the engine driven input of the transmission and a second fluid pressure pump operable with the vehicle driving output of the transmission, said first pressure pump arranged to normally supply fluid under pressure to the transmission for establishment of drive therein and control thereof during operation of the vehicle engine, a pressure regulator valve for controlling the output pressure of said first pump, and additional valve means responsive to a predetermined pressure from said first pump for connecting the output of said second pump to the liquid cooled vehicle brake, said additional valve means responsive to the pressure from said first pump being less than a predetermined minimum to connect the output of said second pump to the transmission for establishment of drive therein.

3. A fluid pressure supply system for a vehicle having a fluid pressure controlled transmission having an engine drive input member and a vehicle driving output member, the vehicle also including at least one liquid cooled vehicle brake, the system including a first fluid pressure pump operated with the engine driven input of the transmission and a second fluid pressure pump operable with the vehicle driving output of the transmission, said first pressure pump arranged to normally supply fluid under pressure to the transmission for establishment of drive therein and control thereof during operation of the vehicle engine, a first pressure regulator valve for controlling the output pressure of said first pump, and additional valve means responsive to a predetermined pressure from said first pump for connecting the output of said second pump to the liquid cooled vehicle brake, said additional valve means responsive to the pressure from said first pump pressure being less than a predetermined minimum to connect the output of said second pump to the transmission for establishment of drive therein, said additional valve means regulating the pressure of the output from said second pump at a pressure lower than that regulated by said pressure regulator valve.

4. A fluid pressure supply system for a vehicle transmission having an input, an output and fluid cooled brake means on said output, said system including a first pump operable in unison with the input of the transmission and a second pump operable in unison with the output of said transmission, means connecting the output of said first pump to said transmission for establishment of drive therein, first pressure regulator valve means controlling the output pressure of said first pump at a predetermined minimum level, second pressure regulator valve means including a valve member in a valve body, said valve body having a first port connected through conduit means to the output of said first pump, a second port connected to the outlet of said second pump, and a third port connected to said fluid cooled brake means, resilient means for normally holding said valve member in a first position to connect said first and second ports, means responsive to a predetermined pressure in said conduit means to urge said second valve against said resilient means to a position to connect said second and said third ports and simultaneously disconnect said first and second ports, said second regulator valve in its first position operable to regulate the output pressure from said second pump at a level less than said predetermined minimum level.

5. A fluid pressure supply system for a vehicle transmission having an input, an output and fluid cooled brake means on said output, said system including a first pump operable in unison with the input of the transmission and a second pump operable in unison with the output of said transmission, means connecting the output of said first pump to said transmission for establishment of drive therein, first pressure regulator valve means controlling the output pressure of said first pump at a predetermined minimum level, second pressure regulator valve means including a valve member reciprocably mounted in a valve body, said valve body having a first port connected through conduit means to the output of said first pump, a second port connected to the outlet of said second pump, and a third port connected to said fluid cooled brake means, resilient means for normally holding said second valve in a position to connect said first and second ports, means responsive to a predetermined pressure in said conduit means to urge said second valve against said resilient means to a position to connect said second and said third ports and simultaneously disconnect said first and second ports, said second regulator valve regulating the output pressure from said second pump at a level less than said predetermined minimum level.

6. In a vehicle having a fluid supply system for both a fluid controlled transmission and a fluid cooled brake, the combination including a first pump arranged to provide fluid under pressure to said transmission, means for controlling the pressure supplied to said transmission, a second pump arranged to provide fluid under pressure to said transmission or said brake, valve means controlling the output of said second pump, said valve means responsive to pressure from said first pump above a predetermined minimum value to connect the output of said second pump solely to said brake and responsive to pressure from said first pump below said predetermined minimum value to connect the output of said second pump to said transmission.

7. In a vehicle having a fluid supply system for both a fluid controlled transmission and a fluid cooled brake, the combination including a first pump arranged to provide fluid under pressure to said transmission, means for controlling the pressure supplied to said transmission, a second pump arranged to provide fluid under pressure to said transmission or said brake, and valve means controlling the output of said second pump, said valve means responsive to pressure from said first pump above a predetermined minimum value to connect the output of said second pump solely to said brake and responsive to pressure from said first pump below said predetermined minimum value to connect the output of said second pump to said transmission, said valve means controlling the pressure of fluid supplied to said transmission when connecting said second pump to said transmission.

8. In a vehicle having a fluid supply system for both a fluid controlled transmission and a fluid cooled brake, the combination including a first pump arranged to provide fluid under pressure to said transmission, means for controlling the pressure supplied to said transmission, a second pump arranged to provide fluid under pressure to said transmission or said brake, valve means controlling the output of said second pump, said valve means responsive to pressure from said first pump above a predetermined minimum value to connect the output of said second pump solely to said brake and responsive to pressure from said first pump below said predetermined minimum value to connect the output of said second pump to said transmission, said valve means limiting the pressure of fluid supplied to said transmission when connecting said second pump to said transmission, said valve means regulating said pressure by relieving excess pressure to said brake.

References Cited in the file of this patent
UNITED STATES PATENTS
2,926,737    Fischer _____ Mar. 1, 1960